United States Patent
Lin et al.

(10) Patent No.: US 7,862,866 B2
(45) Date of Patent: Jan. 4, 2011

(54) METHOD FOR FORMING AN ELECTRONIC PAPER DISPLAY

(75) Inventors: Pinyen Lin, Rochester, NY (US); David H. Pan, Rochester, NY (US); Naveen Chopra, Oakville, CA (US); Peter M. Kazmaier, Mississauga, CA (US)

(73) Assignee: Xerox Corporation, Norwalk, CT (US)

( * ) Notice: Subject to any disclaimer, the term of this patent is extended or adjusted under 35 U.S.C. 154(b) by 893 days.

(21) Appl. No.: 11/753,780

(22) Filed: May 25, 2007

(65) Prior Publication Data
US 2008/0292782 A1 Nov. 27, 2008

(51) Int. Cl.
*B05D 5/12* (2006.01)
*B05D 1/32* (2006.01)
*B05D 1/06* (2006.01)

(52) U.S. Cl. .................. 427/469; 427/458; 427/466; 427/58

(58) Field of Classification Search .................. 427/458, 427/466, 469, 58
See application file for complete search history.

(56) References Cited

U.S. PATENT DOCUMENTS

| 3,668,106 | A | 6/1972 | Ota |
| 4,338,390 | A | 7/1982 | Lu |
| 6,529,313 | B1 | 3/2003 | Lin et al. |
| 6,577,433 | B1 | 6/2003 | Lin et al. |
| 7,123,238 | B2 | 10/2006 | Lin et al. |
| 7,307,780 | B2 * | 12/2007 | Kanbe ........................ 359/296 |
| 2003/0091871 | A1 * | 5/2003 | Yamazaki et al. ........... 428/698 |
| 2004/0125433 | A1 * | 7/2004 | Matsuda et al. ............. 359/296 |
| 2006/0087719 | A1 * | 4/2006 | Kosuge ....................... 359/296 |
| 2007/0201124 | A1 * | 8/2007 | Whitesides et al. ......... 359/296 |
| 2009/0066076 | A1 * | 3/2009 | Schneider ..................... 283/91 |

FOREIGN PATENT DOCUMENTS

| JP | 2000-035769 | 2/2000 |
| JP | 2003-295234 | 10/2003 |
| JP | 2005-070462 | 3/2005 |

OTHER PUBLICATIONS

U.S. Appl. No. 11/468,652, filed Aug. 30, 2006.
U.S. Appl. No. 11/419,440, filed May 19, 2006.

* cited by examiner

*Primary Examiner*—Brian K Talbot
(74) *Attorney, Agent, or Firm*—Oliff & Berridge, PLC

(57) ABSTRACT

Methods form multi-color electrophoretic displays. The method includes providing a solution containing microcapsules, wherein the microcapsules comprise a shell that is transparent and a display medium within the shell, wherein the display medium comprised of either (a) at least two sets of differently colored particles in a substantially clear fluid, or (b) at least one set of colored particles in a differently colored fluid. The method includes dispensing the solution onto a substrate, wherein a display layer of microcapsules is formed on the substrate. The method includes positioning a conductive substrate adjacent to the substrate, wherein the substrate is located between the display layer and the conductive substrate, wherein the conductive substrate applies an electric field to at least one microcapsule of the display layer, wherein the sets of particles of each microcapsule in the display layer are movable within the microcapsule by the electric field to be displayed.

19 Claims, 5 Drawing Sheets

METHOD FOR FORMING AN ELECTRONIC PAPER DISPLAY

TECHNICAL FIELD

Described are methods for forming an electronic paper display with microcapsules having encapsulated reimageable media therein. The microcapsules may be stabilized within a solution, and liquid drops of the solution may be applied to a substrate via an ink jetting method. In the display device, an electric field may be applied to the microcapsules by a conducting substrate to display sets of first colored particles or sets of second colored particles of the encapsulated reimageable media within the microcapsules. In this maimer, the encapsulated reimageable media may be used in forming images with the electronic paper display.

REFERENCES

U.S. Pat. No. 7,123,238, incorporated herein by reference in its entirety, illustrates an electrophoretic display device that includes a spacer layer positioned between two conductive film substrates.

U.S. Pat. No. 6,577,433, incorporated herein by reference in its entirety, illustrates an electrophoretic display device comprising a multiplicity of individual reservoirs, each containing an electrophoretic display fluid, located between two conductive film substrates, at least one of which is transparent. The electrophoretic display fluid has at least two sets of particles dispersed in a transparent liquid system and one or more charge directors dissolved or dispersed in the liquid system or physically embedded on the surface of the particles or chemically bonded on the surface of the surface of the particles. The at least two sets of particles exhibit different, contrasting color and different charging properties from each other.

U.S. patent application Ser. No. 11/468,652, incorporated herein by reference in its entirety, illustrates a display region between substrates, at least one of which is transparent. The display region includes a multiplicity of pixels, wherein one or more of the pixels comprise three or more subpixels. The three or more subpixels are comprised of individual reservoirs that each contain a display medium comprised of one or more set of colored particles in a dielectric fluid. The display medium includes two different colors therein so that the subpixel is capable of exhibiting each of the two different colors, and wherein each of the three or more subpixels include a display medium having a different combination of two colors from the display mediums of all of the other of the three or more subpixels.

BACKGROUND

An electronic paper display may be formed by connecting a thin layer of transparent plastic small beads, which are randomly dispersed, to a surface of a sheet. The beads have two hemispheres that have two contrasting colors, such as black and white, red and white or the like. The hemispheres are electrically charged to exhibit an electrical dipole. For example, the color red on a first hemisphere may be associated with a negative charge and the color white on a second hemisphere may be associated with a positive charge. The hemispheres of the beads are contained within an oil-filled cavity, and rotate within the oil-filled cavities based on electrical charges that attract or repel the electrically charged hemispheres. Thus, the sheet receiving the beads and/or the oil-filled cavities may be required to be stiff and rigid to prevent puncturing of the cavities or damaging of the cavities or the hemispheres of the beads by, for example crushing, flattening or the like.

A voltage is applied to the surface of the sheet via one or more electrode plates associated with the sheet. The voltage applied by the electrode plates provides an electric field which may attract one of the hemispheres of one or more of the beads based on the charge associated with that hemisphere. As a result, one or more of the beads are rotated by the attractive forces between one of the hemispheres of the beads, the charge associated with the hemispheres of the beads, and the electric field created by the electrode plates. As a result, the hemispheres of the beads may rotate to present one of the hemispheres in a viewing direction on the electronic paper. By rotating one or more beads to present one of the hemispheres for each bead, the hemispheres may form or may display an image on the electronic paper. As a result, the electric field applied to the surface of the sheet by the electrode plates creates the image that is viewable from a viewing direction of the electronic paper.

However, connecting a thin layer of the beads having the oil-filled cavities to the surface of the sheet to form the electronic paper is often time consuming and costly. Additionally, a resolution of the images formed on the surface of the electronic paper by the one or more beads tends to be lower because a pixel count per square inch for the thin layer of beads formed on the surface of the sheet is often minimal as compared to a resolution of a conventional display, such as an LCD. Further, increasing the pixels per square inch by increasing a number of beads per square inch on the surface of the sheet is burdensome because difficulties exist for positioning the oil-filled cavities at specific locations corresponding to specific pixels or subpixels. Moreover, sealing an increased number of oil-filled cavities to the surface of the sheet to increase the pixels per square inch is inconvenient for forming electronic paper via the beads. The rotation of the beads to display different hemispheres often tends to be too slow for some display purposes, such as screens and the like. As a result, forming electronic paper with the beads having oil-filled cavity has an increased probability for manufacturing problems and often elevates production costs for the electronic paper.

A need, therefore, exists for a method for forming electronic paper displays with microcapsules having encapsulated color liquids via liquid printing methods. Further, a need exists for a method for forming electronic paper displays by dispensing microcapsules having encapsulated reimageable media onto a surface of a substrate. Moreover, a need exists for a method for forming electronic paper displays which may position a substrate having microcapsules dispensed thereon between one or more conductive substrates for applying an electric field.

SUMMARY

Described herein is a method for forming an electronic paper display with microcapsules having encapsulated reimageable media.

Each microcapsule may have encapsulated reimageable media, such as, for example, two differently colored particles suspended in a medium, and may be applied to a substrate in forming the electronic paper display. The microcapsules may be stabilized in a solution, and liquid drops of the solution may be applied to or printed to the substrate using a printing method. The liquid portion of the solution may be removed from the substrate to produce a display layer of the encapsulated reimageable media on the substrate. The resolution, that is, the density of the microcapsules printed onto the substrate, may be based on a liquid drop size and/or a size of the microcapsules. A protective layer may be applied to the microcapsules to provide mechanical protection for the microcapsules. The substrate having the microcapsules may be positioned between conductive substrates for applying an electric field to the encapsulated reimageable media to display one or more images.

According to aspects illustrated herein, there is provided a method for forming a multi-color electrophoretic display. The method includes providing a solution containing microcapsules, wherein the microcapsules comprise a shell that is transparent, a display medium within the shell and at least two sets of differently colored particles suspended in the display medium within the shell. The method further includes dispensing the solution onto a first substrate, wherein a display layer of microcapsules is formed on the first substrate. The method includes positioning a second substrate adjacent to the first substrate, wherein the first substrate is located between the display layer and the second substrate, wherein the second substrate may be used to apply an electric field to at least one microcapsule of the display layer, wherein the sets of particles within the microcapsules are movable within the microcapsule by the electric field to display an intended color.

In embodiments, provided is a method for forming a multi-color electrophoretic display. The method includes stabilizing microcapsules within a solution having a liquid portion, wherein the microcapsules comprise a shell that is transparent, a display medium within the shell and at least two sets of differently colored particles suspended in the display medium within the shell. Further, the method includes dispensing the solution onto a first substrate and removing the liquid portion of the solution, wherein removal of the liquid portion forms a display layer of microcapsules on the first substrate. The first substrate and the display layer are positioned between a second substrate and a third substrate, wherein the third substrate is transparent and located adjacent to the display layer, wherein the second substrate is adjacent to the first substrate and applies an electric field to at least one microcapsule of the display layer, wherein the sets of particles within the microcapsules are movable within the microcapsule by the electric field to display an intended color.

It is an advantage of the various embodiments described herein to provide a method for forming an electronic paper display which may apply microcapsules having two differently colored particles suspended in a display medium therein. Another advantage of the various embodiments is to provide a method for forming an electronic paper display which may dispense microcapsules having encapsulated reimageable media onto a substrate to form a high resolution colored display. Moreover, another advantage of the various embodiments is to provide a method for forming an electronic paper display which may be manufactured at a lower cost than a conventional display, such as a liquid crystal display or the like.

Additional features and advantages of the various embodiments are described herein and/or will be apparent from the description.

EMBODIMENTS

Figure 1:
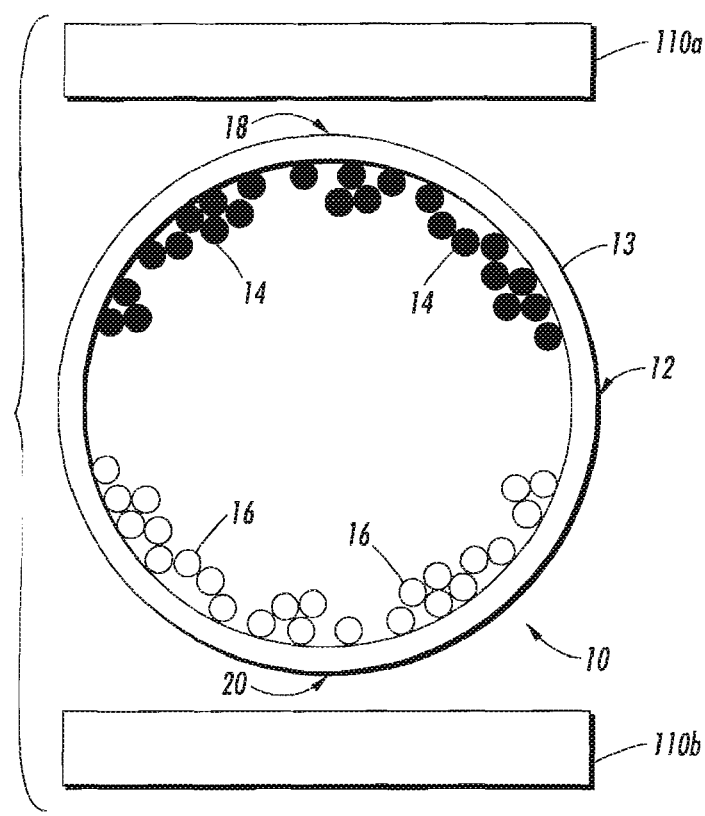
FIG. 1 is a cross-sectional view of a microcapsule having suspended sets of particles in a first state in an embodiment of the present disclosure.

Generally, in various exemplary embodiments, there is provided a method for producing an electronic paper display with microcapsules having encapsulated reimageable media suspended in a display medium therein. The encapsulated reimageable media may include, for example, at least two differently colored particle sets suspended in the display media, the differently colored particles being movable within the display media by an electric field. The microcapsules may be added to a solution, optionally may be stabilized within the solution, and may be applied to a substrate with the solution. The liquid portion of the solution may then be removed from the substrate to produce a display layer of microcapsules on the substrate. A resolution of the display layer of microcapsules, that is, the density of the microcapsules dispensed onto the substrate, may be based on or associated with a size of the encapsulated reimageable media and/or a size of the liquid drops of the solution applied to the substrate. A coating may be applied to the microcapsules to protect the microcapsules and the substrate from damaging mechanical forces. The substrate and the microcapsules may be positioned between conductive substrates to form an electrophoretic display or a display device. The conductive substrates may be used to apply an electric field to the encapsulated reimageable media to manipulate movement of the particles so that specific colors are seen by a viewer at locations and/or pixels, thereby displaying an image with the encapsulated reimageable media of the microcapsules.

A color display refers to, for example, any display capable of displaying at least two different colors. Examples include black and white colors, as well as fall color displays such as red, green, blue and/or black, or cyan, magenta, yellow and/or black, and highlight color displays, including two colors highlighted and/or shaded with a third color.

In embodiments, the microcapsules encapsulate reimageable media (electrophoretic display medium) is comprised of at least one fluid and at least one, for example at least two, such as from two to ten or from two to four, set(s) of colored particles and/or electrophoretic particles dispersed in the fluid.

The encapsulated reimageable media comprises one or more sets of colored particles dispersed in a fluid system. The fluid may be either clear/transparent, or it may exhibit a visible color, for example a different, contrasting color from the color(s) exhibited by the sets of particles dispersed therein. A colored fluid is typically used in a display employing a single set of colored particles, for example white particles, with the color of the fluid being a contrasting color other than white.

In embodiments, the fluid of the microcapsules and the set(s) of particles therein may have densities that are substantially matched, for example wherein the densities of these materials are within about 25% of each other, or more specifically within 20% of each other or within 10% of each other. In other embodiments, the fluid may comprise two immiscible fluids having different densities such that the first immiscible fluid having a density less than that of the second immiscible fluid rests on top of the second immiscible fluid, and each of the sets of particles has a density in between the densities of the two immiscible fluids such that the particles rest at an interface between the two immiscible fluids. The density of the colored particles and/or the electrophoretic particles for the encapsulated reimageable media may be substantially matched to that of the suspending fluid. For example, a suspending fluid may have a density that is "substantially matched" to the density of the colored particles and/or the electrophoretic particles dispersed therein if the difference in their respective densities is from about zero to about 2 g/ml, for example from about zero to about 0.5 g/ml.

The fluid may comprise from about 11% to about 95% by weight of the display medium, for example from about 30% to about 90% or from about 40% to about 80% by weight of the display medium.

The fluid may be comprised of any suitable fluid known in the art for use in electrophoretic displays. Fluid refers to, for example, a material in a liquid state, and is not a gas or air. Of course, air or any other gas may also be present in the microcapsules of the display device, but the fluid of the microcapsules refers to a fluid in a liquid state. The choice of fluid may be based on concerns of chemical inertness, density matching to the particles to be suspended therein and/or chemical compatibility with the particles. In embodiments, the suspending fluid may have a low dielectric constant (for example, about 4 or less, such as about 0.5 to about 2). The viscosity of the fluid may be relatively low at the temperatures of operation in order to permit the particles to move therein, for example under the influence of an electrical field. In embodiments, the fluid may have a kinematic viscosity in the range of about 0.25 centistokes to about 10 centistokes, for example from about 0.5 centistokes to about 5 centistokes or from about 1 centistoke to about 2 centistokes, at about room temperature (about 23° C. to about 27° C.). The fluid may be dielectric and substantially free of ions. The fluid also may have minimum solvent action on the colored particles therein, and a specific gravity substantially equal to the colored particles, for example within about 20% of each other. Additionally, the fluid may be chosen to be a poor solvent for some polymers, which is advantageous for use in the fabrication of particles because it increases the range of polymeric materials useful in fabricating particles.

In embodiments, organic solvents such as halogenated organic solvents, saturated linear or branched hydrocarbons, silicone oils, and low molecular weight halogen-containing polymers are a few suitable types of fluids that may be used. Organic solvents may include, for example, epoxides such as, for example, decane epoxide and dodecane epoxide, vinyl ethers such as, for example, cyclohexyl vinyl ether, and aromatic hydrocarbons such as, for example, toluene and naphthalene. Halogenated organic solvents may include, for example, tetrafluorodibromoethylene, tetrachloroethylene, trifluorochloroethylene, 1,2,4-trichlorobenzene, carbon tetrachloride, mixtures thereof and the like. These materials may have high densities. Hydrocarbons may include, for example, decane, dodecane, tetradecane, xylene, toluene, hexane, cyclohexane, benzene, the aliphatic hydrocarbons in the ISOPAR™ (Exxon), NORPAR™ (a series of normal paraffinic liquids from Exxon), SHELL-SOL™ (Shell), and SOLTROL™ (Shell) series, naphtha, and other petroleum solvents. These materials may have low densities. Examples of silicone oils include octamethyl cyclosiloxane and higher molecular weight cyclic siloxanes, poly(methyl phenyl siloxane), hexamethyldisiloxane and polydimethylsiloxane. These materials may have low densities. Low molecular weight halogen-containing polymers may include, for example, poly(chlorotrifluoroethylene) polymer or KRYTOX™ polymers (Dupont).

Typically, hydrocarbon fluids such as ISOPAR M are used for electrophoretic ink applications due to their low cost, good dielectric strength, low volatility, and nonreactivity.

In embodiments, the aliphatic hydrocarbons may cause degradation of performance, for example when non-crosslinked emulsion aggregation particles are used as the colored particles of the encapsulated reimageable media and/or when the colored particles are imparted with a charge by treatment with a surface coating that can be desorbed from the particle surface in the presence of an aliphatic hydrocarbon. Thus, it may be desirable to use, as the fluid of the encapsulated reimageable media, a nonswelling fluid such as a silicone fluid. A commercially available silicone fluid includes DOW 200, a polydimethylsiloxane polymer available from Dow Corning. Other examples of suitable silicone fluids include polydimethylsiloxane fluids available from Gelest Corporation such as trimethylsiloxy terminated fluids DMS-T00, DMS-T01, DMS-T01.5, DMS-T02, DMS-T03, DMS-T05, DMS-T07, DMS-T11; cyclomethicones such as SIO6700.0, SID2650.0, SID4625.0 (also known as D4, D5, and D6 fluids, respectively); phenylmethylsiloxanes such as PMM-0011, PDM-7040; fluorosilicones such as SIB1816.0; polydiethylsiloxanes such as DES-T03, DES-T11; branched and low viscosity phenyltris(trimethylsiloxy)silane fluids such as SIP6827.0, phenethyltris(trimethylsiloxy)silane fluids such as SIP6722.8, and the like.

If colored, the fluid may be colored by any suitable means in the art, including through the inclusion of suitable dispersible colorants such as dyes and/or dispersible pigments therein.

In embodiments, the fluid is substantially free of charge control additives and other ionic species that may affect the charging behavior of the encapsulated reimageable media and/or the particles dispersed therein. However, in other embodiments, the fluid may contain additives such as surface modifiers to modify the surface energy or charge of the particles and such as charge control agents, dispersants, and/or surfactants.

In embodiments, the encapsulated reimageable media includes at least one set of particles exhibiting substantially the same color. The encapsulated reimageable media may be comprised of one set of colored particles, including at least two, such as from two to ten or from two to four, sets of differently colored particles dispersed in the fluid. Color refers to, for example, the overall absorption characteristic within the range of wavelengths of the electromagnetic spectrum. Substantially the same color herein refers to, for example, particles exhibiting substantially the same hue and contrast (darkness/lightness) as other particles in the set. Colored particles of different sets of particles in the encapsulated reimageable media exhibit a color, that is, an absorption characteristic, different from each other. For example, if a first set of particles exhibits a yellow color, then a second differently colored set of particles will exhibit a different shade (hue and/or contrast) of yellow or a different color altogether, for example such as cyan or magenta.

An encapsulated reimageable media may include two sets of differently colored particles, for example black particles and white particles. In embodiments, the encapsulated reimageable media comprises at least three differently colored sets of particles. As examples, the three sets of colored particles may comprise the three subtractive primary colors yellow, cyan and magenta, or may comprise red, blue and green. An example encapsulated reimageable media containing four sets of differently colored particles may comprise yellow, cyan, magenta and black. Additional differently colored sets of particles, for example for highlight coloring, may be included as additional sets of colored particles in any embodiment described herein.

In embodiments, it is desirable to have several different two particle microcapsules comprise a portion of the display that is equivalent to one pixel of the display. Each microcapsule in the pixel may include a set of white particles and a set of non-white particles, or sets with differently colored particles of two different non-white colors. For example, different microcapsules of a same pixel may comprise red/white, blue/white, green/white and optionally black/white, or red/green, blue/green, red/blue, optionally black/white, color combinations.

Each particle within a first set of particles may display, may present or may provide a first color. Further, each particle within a second set of particles may display, may present or may provide a second color different from the first color. In embodiments, a first set of particles may be a color, such as, red, orange, yellow, green, blue, green or black, and a second set of particles may be white. Alternatively, the first set of particles may be a color and the second set of particles may be a different non-white color. In embodiments, the first set of particles may be one of cyan, yellow, magenta and black. Moreover, the second set of particles may be a different one of cyan, yellow, magenta and black than the first set of particles.

In embodiments, a third set of particles and/or a fourth set of particles may be optionally included with the first set of particles and second set of particles within the shell or suspended in the display medium of the microcapsules. For example, a first set of particles may be cyan, a second set of particles may be yellow, a third set of particles may be magenta and a fourth set of particles may be black. In embodiments, the third set of particles and/or the fourth set of particles may be colored particles or electrophoretic particles. The present disclosure should not be deemed as limited to specific embodiments of the sets of particles. It should be understood that the number of particles sets within the shell of the microcapsule may be any number of particles sets as known to one of skill in the art.

Each set of same colored particles in the microcapsules may comprise from about 5% to about 50% by weight, for example from about 5% to about 40% or from about 5% to about 30% by weight, of the microcapsules.

In embodiments, described is a low electrical conductivity electrophoretic encapsulated reimageable media, for example having a conductivity on the order of about $10^{-11}$ to about $10^{-15}$ S/m, such as from about $10^{-12}$ to about $10^{-14}$ S/m or from about $10^{-12}$ to about $10^{-13}$ S/m. The conductivity of the encapsulated reimageable media is thus comparable to that of the dielectric fluid. The particles of the encapsulated reimageable media may become charged by the application of a high electric field thereto, which may also be referred to as field-induced or in situ charging, in which particle charging is dependent on, for example, the field strength and the charging time (or number of charging cycles). Following charging, the particles may have a charge (charge to mass ratio) on the order of microcoulombs ($\mu$C) per gram (that is, on the order of $10^{-6}$ C/g), such as from about ±0.1 to about ±20 $\mu$C/g, from about ±0.2 to about ±10 $\mu$C/g or from about ±0.3 to about ±5 $\mu$C/g.

The microcapsules, including the fluid and particle sets therein, of embodiments herein may thus be made to be substantially free of charge control additives and similar excess ionic species affecting the charging characteristics and/or conductivity of the encapsulated reimageable media. Substantially free of ions herein refers, for example, to the encapsulated reimageable media being free of ionic species to the extent that the aforementioned conductivity values may be achieved. As a result, the encapsulated reimageable media herein is able to exhibit the aforementioned low conductivity properties.

As a result of the desired absence of charge control additives in the microcapsules, the particles of the sets of particles of the encapsulated reimageable media need to be made to include a capability of exhibiting the low charging property by other methods. Such may be accomplished, for example, by the formation of the particles in the presence of a surfactant and/or water, wherein small amounts of these materials may be incorporated into the particles during formation. Other components that could impart the charge to the particles include polymerization initiators such as APS (ammonium persulfate), chain transfer agents such as DDT (dodecylthiol), or acidic/basic functional groups in the polymer backbone that may be exposed or partially exposed on the particle surface. These materials may act as charge species in the particles, imparting an almost negligible charge at time zero but that which enables the particles to be charged, for example through application of a high electric field as will be described more fully below, to the low charge values described above. These materials are part of the particles and substantially do not become dissociated in the encapsulated reimageable media, thereby enabling the encapsulated reimageable media to maintain the low conductivity. Moreover, unlike prior systems requiring the presence of ionic species in the encapsulated reimageable media that permit the display to degrade in performance over time, for example through the generation of wrong sign particles and/or loss of sufficient ionic species in the medium, the particles herein do not generate ionic species and do not require the presence of ionic species for charging, and thus are not subject to such degradation risks.

As the particles of the encapsulated reimageable media, any particle made by any suitable process may be used, so long as the particles are capable of exhibiting the low charge property discussed above. Thus, particles made by both physical grinding methods, in which the material of the particles is formed as a mass that is then crushed and ground to the desired average particle size, and chemical build-up methods, in which the particles are grown individually within a reaction medium to the desired average particle size, both of which types of methods are well known in the toner art, may be used. The particles may be made to have an average size of from, for example, about 5 nm to about 100 $\mu$m, such as from about 10 nm to about 50 $\mu$m or from about 0.5 $\mu$m to about 25 $\mu$m. The particles have a size less than the size of the shells of the microcapsules in which the display medium will be contained so that the particles are free to move within the shells.

The colored particles or the electrophoretic particles may be neat pigments, dyed (laked) pigments, pigment/polymer composites, dyed or pigmented agglomerated polymer particles and the like. As the colorant of the particles, dyes, pigment, mixtures of dyes, mixtures of pigments or mixtures of dyes and pigments may be used. Particles and/or colorant of particles may also include laked, or dyed, pigments, in which a dye is precipitated on the particles or the particles are stained with a dye such as metal salts of readily soluble anionic dyes, for example dyes of azo, triphenylmethane or anthraquinone structure containing one or more sulphonic or carboxylic acid groupings precipitated by a calcium, barium or aluminum salt.

Typical manufacturing techniques for the above particles are drawn from the liquid toner and other arts and include ball milling, attrition, jet milling, and the like. A pigmented polymer particle may be made by, for example, compounding a pigment in the polymer. The composite material is then (wet or dry) ground to a desired size. It may then optionally be added to a carrier liquid and milled under high shear for several hours to a final particle size and/or size distribution.

Chemical processes that may be used in forming the particles include, for example, emulsion aggregation, dispersion polymerization, mini- or micro-emulsion polymerization, suspension polymerization, precipitation, phase separation, solvent evaporation, in situ polymerization, or any process of microencapsulation.

Polymers that may be used for the pigmented particles include, for example, polystyrene, polyethylene, polypropylene, phenolic resins, ethylene-vinyl acetate copolymers, polyesters, polyacrylates, polymethacrylates, ethylene acrylic acid or methacrylic acid copolymers, acrylic copolymers and terpolymers and the like. Specific example include, for example, polyethylene, polypropylene, polymethylmethacrylate, polyisobutylmethacrylate, polystyrene, polybutadiene, polyisoprene, polyisobutylene, polylauryl methacrylate, polystearyl methacrylate, polyisobornyl methacrylate, poly-t-butyl methacrylate, polyethyl methacrylate, polymethyl acrylate, polyethyl acrylate, polyacrylonitrile, and copolymers of two or more of these materials.

In embodiments, the particles for the encapsulated reimageable media are emulsion aggregation particles, for example including polyester resin based emulsion aggregation particles and styrene-acrylate or acrylate resin based emulsion aggregation particles. Such particles are chemically grown and tend to be substantially monodisperse in size and substantially spherical in shape. Another advantage to emulsion aggregation particles is that the particle surface is substantially completely passivated by the binder resin, which may eliminate the contribution of the colorant, such as pigment, to the particle charge.

As surfactants for use in making emulsion aggregation particles as discussed above, examples include anionic, cationic, nonionic surfactants and the like.

The particle preparation is typically carried out in an aqueous (water) environment as detailed above, and the electrophoretic encapsulated reimageable media is an non-aqueous environment (oil). When the colored particles are prepared, they are given a final water wash to remove excess surfactant. Trace amounts of residual surfactant on the surface of the colored particles, or trapped within the colored particles itself, may remain and contribute to the low conductivity of the colored particles. However, the amount of surfactant that actually gets into the oil is very low, since it prefers to be in water. As a result, the fluid medium has a desired low conductivity.

In embodiments, the emulsion aggregation particles are made to have an average particle size of from about 0.5 to about 25 μm, for example about 5 to about 15 μm or about 5 to about 12 μm. The particle size may be determined using any suitable device, for example a conventional Coulter counter.

Although not required, the colored particles and/or the electrophoretic particles may also include additional known positive or negative charge additives in effective suitable amounts of, for example, from about 0.1 to about 5 weight % of the toner, such as quaternary ammonium compounds inclusive of alkyl pyridinium halides, bisulfates, organic sulfate and sulfonate compositions such as disclosed in U.S. Pat. No. 4,338,390, cetyl pyridinium tetrafluoroborates, distearyl dimethyl ammonium methyl sulfate, aluminum salts or complexes, and the like.

As dyes for the colorant of the colored particles and/or the electrophoretic particles, examples of suitable dyes include Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Particularly preferred are solvent dyes; within the class of solvent dyes, spirit soluble dyes are preferred because of their compatibility with the ink vehicles of the present invention. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon KayaK); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), and the like. Neozapon Black X51 [C.I. Solvent Black, C.I. 12195] (BASF), Sudan Blue 670 [C.I. 61554] (BASF), Sudan Yellow 146 [C.I. 12700] (BASF), and Sudan Red 462 [C.I. 260501] (BASF) are preferred.

Examples of pigments that may be used as the colored particles and/or the electrophoretic particles herein, or that may be used as the colorant in polymer particles, include neat pigments such as, for example, titania, barium sulfate, kaolin, zinc oxide, carbon black and the like. The pigment should be insoluble in the suspending fluid. Additional pigments may include, for example, carbon black such as REGAL 330 carbon black, acetylene black, lamp black, aniline black, Violet PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical 249-1284); PALIOGEN Red 3340 (BASF); SUNFAST® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); SPECTRA PAC® C Orange 16 (Sun Chemical 276-3016); HELIOGEN Blue K6902, K6910 (BASF); SUNFAST® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF) NOVOPERM Yellow FGL (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF), mixtures thereof and the like.

In polymer particles, the colorant may be included in the colored particles or the electrophoretic particles in an amount of from, for example, about 0.1 to about 75% by weight of the particles, for example from about 1 to about 50% by weight or from about 3 to about 25% by weight of the particles.

In any of the foregoing particle embodiments, the colored particles or the electrophoretic particles may also include one or more external additives on the surfaces thereof. Such external additives may be applied by blending, for example with a Henschel blender. In embodiments, the external additive package may include one or more of silicon dioxide or silica ($SiO_2$), titanium dioxide or titania ($TiO_2$), titanic acid, cerium oxide, calcium or zinc stearate, and the like. The colored particles or the electrophoretic particles may have an average size (diameter) of from about 5 nn to about 250 nm. Mixtures of differently sized particles may also be used, for example a first silica having an average primary particle size, measured in diameter, in the range of, for example, from about 5 nm to about 50 nm, such as from about 5 nm to about 25 nm or from about 20 nm to about 40 nm and a second silica having an average primary particle size, measured in diameter, in the range of, for example, from about 100 nm to about 200 mm, such as from about 100 nm to about 150 nm or from about 125 nm to about 145 nm. The external additive particles may also be treated with a surface material.

In embodiments, the external additives may be used to impart charge to the colored particles and/or the electrophoretic particles. For example, a silica particle treated with polydimethylsiloxane (PDMS) or hexamethyldisilane (HMDS) can impart a positive charge. A titanic acid treated with isobutyl trimethoxysilane can impart a negative charge.

In embodiments, the microcapsules may be made to have a size (diameter) of from, for example, about 5 microns to about 1,000 microns, such as from about 5 to about 200 microns or from about 5 to about 50 microns.

For making the microcapsules, any suitable method of encapsulation may be used. The process of encapsulation may include conventional or complex coacervation, interfacial polymerization, in-situ polymerization, electrolytic dispersion and cooling, or spray-drying processes. In these processes, the display medium is added to a solution of the wall-forming material to be encapsulated thereby, and the resulting encapsulated microspheres may be subjected to crosslinking. The microcapsules may be prepared using melamine-formaldehyde, urea-formaldehyde, resorciriol-formaldehyde, phenol-form aldehyde, gelatin-formaldehyde, isocyanate-polyol, interpolymer complexes of two oppositely charged polymers such as gelatin/gum arabic, gelatin/polyphosphate, and poly(styrene sulfonic acid)/gelatin, hydroxypropyl cellulose, mixtures and/or combinations of the foregoing, and the like, as microcapsule wall-forming materials.

The interfacial polymerization approach may rely on the presence of an oil-soluble monomer in an electrophoretic composition, which is present as an emulsion in an aqueous phase. The monomers in the minute hydrophobic droplets may react with a monomer to be introduced into the aqueous phase, polymerizing at the interface between the droplets and the surrounding aqueous display medium and forming shells around the droplets. Although the resulting walls are relatively thin and may be permeable, this process does not require the elevated temperatures characteristic of some other processes, and therefore affords greater flexibility in terms of choosing the display medium.

Coating aids may be used to improve the uniformity and quality of the electrophoretic microcapsules. Wetting agents are typically added to adjust the interfacial tension at the microcapsule/substrate interface and to adjust the liquid/air surface tension. Wetting agents include, for example, anionic and cationic surfactants, and nonionic species, such as silicone or fluoropolymer-based materials. Dispersing agents may be used to modify the interfacial tension between the microcapsules and binder or the substrate, providing control over flocculation and particle settling.

Surface tension modifiers may be added to adjust the air/ink interfacial tension. Polysiloxanes are typically used in such an application to improve surface leveling while minimizing other defects within the coating. Surface tension modifiers include, for example, fluorinated surfactants, such as, for example, the ZONYL series from DuPont, the FLUO-RAD series from 3M (St. Paul, Minn.), and the fluoroalkyl series from Autochem; siloxanes, such as, for example, SIL-WET from Union Carbide; and polyethoxy and polypropoxy alcohols. Antifoams, such as silicone and silicone-free polymeric materials, may be added to enhance the movement of air from within a microcapsule formation solution to a surface of the substrate and to facilitate the rupture of bubbles at the surface. Other useful anti foams include, for example, glyceryl esters, polyhydric alcohols, compounded antifoams, such as oil solutions of alkylbenzenes, natural fats, fatty acids, and metallic soaps, and silicone antifoaming agents made from the combination of dimethyl siloxane polymers and silica. Stabilizers such as UV-absorbers and antioxidants may also be added to improve the lifetime of the microcapsules.

The coacervation approach may utilize an oil/water emulsion. One or more colloids are coacervated (that is, agglomerated) out of the aqueous phase and deposited as shells around the oily droplets through control of temperature, pH and/or relative concentrations, thereby creating the microcapsule. Materials suitable for coacervation include gelatins and gum arabic.

In an example complex coacervation process, the display medium to be encapsulated is emulsified with the wall forming material, for example a mixture of water, gelatin and gum arabic, at an elevated temperature of, for example, about 30° C. to about 80° C. such as from about 35° C. to about 75° C. or from about 35° C. to about 65° C. The pH is then reduced, for example to less than 5, for example from about 4 to about 5 such as from about 4.4 to about 4.9, through addition of an acid such as acetic acid and the like, to induce coacervation. The material of the wall of the microcapsules may then be crosslinked, for example by adding gluteraldehyde and the like and agitating the mixture in the presence of, for example, urea.

The microcapsules may have a multi-layer wall around the particles suspended within the display medium to define a shell of each microcapsule. These can be made, for example, by first forming a thin wall by an interfacial polymerization reaction, and subsequently forming a second, thicker wall by an in-situ polymerization reaction or by a coacervation process. The first wall of the microcapsule may be typically comprised of polyurea, polyurethane, polyamide, polyester, epoxy-amine condensates, silicones and the like. The second wall of the microcapsule may be comprised of condensates of melamine-formaldehyde, urea-formaldehyde, resorcinol-formaldehyde, phenol-formaldehyde, gelatin-formaldehyde, or interpolymer complexes of tvo oppositely charged polymers such as gelatin/gum arabic and poly(styrene sulfonic acid)/gelatin.

A semi-continuous miniemulsion polymerization process may also be used to encapsulate the electrophoretic display medium or the particles, for example as described in U.S. Pat. No. 6,529,313, incorporated herein by reference in its entirety.

A benefit of encapsulating the electrophoretic display medium is that the microcapsules can be made to be spherical or other than spherical through control of the process. Different shapes may permit better packing density of the microcapsules and better display quality.

Once generated, the microcapsules may then be applied to a substrate by a suitable dispensing, application or printing method. In embodiments, the microcapsules are incorporated into a solution, and jetted onto a substrate, for example, by known ink jet jetting procedures. The jetting is done at low temperature, for example at about 20° C. to about 30° C., so as not to damage the microcapsules. Higher temperatures are not required for jetting, as the solution is liquid at room temperature, and thus does not need to be melted first before jetting.

The microcapsules may be mixed with/or may be stabilized within a solution for application onto the surface of the substrate via the ink jetting method or the like. The latitude in formulation of the solution is enormous, limited only by solvent choices and polymer solubility. For example, solvents should be chosen that do not fatally affect the integrity of the capsule wall. For example, the solvent may include an organic solvent that does not compromise the integrity of the microcapsule wall. Suitable solutions may include ISOPAR, one or more silicone fluids, toluene, methyl ethyl ketone or the like. Water may be included in the solution, but only if it does not damage the walls of the microcapsule from swelling or the like. In embodiments, the microcapsules may be loaded into the solution in amounts of up to about 35% by weight of the solution, for example from about 12% to about 30% by weight of the solution.

The microcapsules may adhere to the surface of the substrate by, for example, using any suitable binder such as an adhesive or polymer matrix material that is either mixed with the microcapsules prior to applying the microcapsules on the substrate, coated onto the substrate before application of the microcapsules thereon, coated upon the microcapsules after placement upon the substrate, or one or more of the above, including all three.

As an adhesive or binder, any material may be used, for example including polyvinyl alcohol (PVA) or polyurethane such as NEOREZ. A binder may be used as an adhesive medium that supports and protects the microcapsules, as well as binds conductive substrate to the microcapsule dispersion or a display layer of microcapsules. A binder can be non-conducting, semiconductive, or conductive. Binders are available in many forms and chemical types. Among these are water-soluble polymers, water-borne polymers, oil-soluble polymers, thermoset and thermoplastic polymers, and radiation-cured polymers.

Among water-soluble polymers are various polysaccharides, polyvinyl alcohols, N-methlylpyrrolidone, N-vinylpyrrolidone, various CARBOWAX species (Union Carbide), and poly(2-hydroxyethyl acrylate).

The water-dispersed or water-borne systems are generally latex compositions, for example NEOREZ and NEOCRYL resins (Zeneca Resins), ACRYSOL (Rohm and Haas), BAYHYDROL (Bayer), and the HP products (Cytec Industries). These may generally be lattices of polyurethanes, occasionally compounded with one or more of acrylics, polyesters, polycarbonates or silicones, each lending the final cured resin in a specific set of properties defined by glass transition temperature, degree of tack, softness, clarity, flexibility, water permeability and solvent resistance, elongation modulus and tensile strength, thermoplastic flow, and solids level. Some water-borne systems may be mixed with reactive monomers and catalyzed to form more complex resins. Some may be further cross-linked by the use of a cross-linking reagent, such as an aziridine, for example, which reacts with carboxyl groups.

In the display layer formed on the surface of the substrate, the microcapsules may be arranged in abutting, side-by-side relationship and in embodiments are arranged in a monolayer (that is, the microcapsules are not stacked) on the substrate. However, more than one display layer of microcapsules may also be used. In embodiments, the electronic display may be formed by at least one display layer of microcapsules, for example, one to ten display layers of the microcapsules, such as one to four display layers of the microcapsules or one to two display layers of the microcapsules. The electronic display may be formed by sandwiching the substrate with at least one display layer of microcapsules between a first or front conductive substrate and a second or rear conductive substrate. If desired, different display layers of the microcapsules applied to the surface of the substrate may be used for different color display mediums. The display layer of microcapsules may have a thickness of from about 5 to about 1,000 μm, for example from about 10 to about 500 μm or from about 20 to about 350 μm. This embodiment thus relates to a way of incorporating the microcapsules and the display medium into a display layer of an electronic display or an electrophoretic display device that can easily be applied to create large area display devices on a substrate.

In embodiments, the electronic display device may also be made to include an absorptive backplane, for example a light absorptive backplane. Very thin display devices with substantially clear conductive substrates such as indium tin oxide (ITO) coated glass or ITO coated polymer such as MYLAR may exhibit low optical density, and a washed out appearance with low color saturation. A highly absorptive backplane may reduce the light transmission through the electronic device, thereby eliminating the washed out appearance of the display. The contrast is greater, and the color saturation appears higher.

The absorptive backplane may desirably have a black color. This may be achieved by any suitable method. For example, a black colored film or paint may be added onto the substrate having the display layer of microcapsules thereon. The absorptive backplane may be applied either before or after formation of the display, for example, before application of the microcapsules to the substrate, or after applying the display layer of microcapsules onto the substrate. Also, the coloring agent imparting the dark color such as black may be incorporated directly into the substrate having the display layer of microcapsules or onto the rear conductive substrate, such that the rear conductive substrate acts as both the conductive layer and the absorptive backplane.

In embodiments, a protective layer may be sprayed onto and may coat the substrate and/or the microcapsules. The substrate and/or the microcapsules may be covered or substantially covered by the protective layer. As a result, the protective layer may provide mechanical protection for the substrate and/or the microcapsules by covering or substantially covering the microcapsules. In embodiments, the protective layer may be made from a polymer, such as, for example, a thermoplastic or the like.

Controlling movement of the encapsulated reimageable media (the sets of particles) within the microcapsules and controlling image formation by the encapsulated reimageable media within the microcapsules is described in application Ser. No. 11/419,440, filed May 19, 2006, which is incorporated herein by reference in its entirety.

After formation of the microcapsules having charged particles therein, the display layer of microcapsules may be applied, dispersed, printed or formed on the substrate. The substrate and the display layer may be sandwiched between the conductive substrates to define an electrophoretic display device. In operating the microcapsules or the display layer of microcapsules of the electrophoretic display device so as to form an image therewith, an electric field, in particular a reversible direct current or an alternating current, is applied directly to or adjacent to the microcapsules in the display layer of the device by at least one of the conductive substrates. As a result, the electric field may move one or more desired particle sets in the microcapsules so as to be displayed by the display device.

In embodiments of the display device, each of the individual microcapsules may be individually addressable, that is, a separate electric field may be applied to each individual microcapsule in the display layer to generate an appropriate color at that individual microcapsules. Appropriate sets or groups of different ones of the individual microcapsules may also be associated with a same driving electrode in one or more of the conductive substrates. For example, in a display device, each microcapsule or a set of microcapsules in the display layer may represent a pixel or sub-pixel of an image, and each pixel or sub-pixel may thus be separately controlled to generate a desired overall image from the display device.

Control methods, including hardware/software, for controlling each microcapsule in the display layer of the display device in a manner enabling an overall image to be shown are known in the display arts, and any such control method may be applied herein. To permit individual addressability, the size of the electrodes of the conductive substrates may be the same as or smaller than the size of the individual microcapsule of the display device, enabling individual control of each. In this manner, the electric field applied to each microcapsule can be individually controlled. Also, the size of the electrodes can be different from (for example, larger than) the size of the microcapsules, thereby enabling more than one microcapsule to be controlled by a single electrode where the electrode is larger than an individual microcapsule, or also enabling only a portion of the microcapsule to be controlled (turned on and off) by an electrode where the electrode is smaller than the size of the microcapsule. That is, the pattern of the electrodes does not need to line up with the microcapsules. Any of the foregoing can be done by, for example, appropriate patterning of the conductive path on the rear conductive substrate. An example of the patterning of electrodes can be found in, for example, U.S. Pat. No. 3,668,106, Incorporated herein by reference in its entirety.

The strength of the electric field that may be applied to effect movement of the colored particles and/or the electrophoretic particles may be defined as the voltage divided by the thickness of the gap between the two conductive substrates. Typical units for electric field are volts per micron (V/$\mu$m). In embodiments, the charge level of each particle may have an electric field ranging from about 0.5 to about 3 V/$\mu$m. Applied electric fields may range from about 0.1 V/$\mu$m to about 25 V/$\mu$m, for example from about 0.25 V/$\mu$m to about 5 V/$\mu$m, or from about 1 V/$\mu$m to about 2 V/$\mu$m, or any ranges in between. The duration of electric field application can range from about 10 msec to about 5 seconds, or from about 100 msec to about 1 second, or any ranges in between. Generally, the greater the charge on the colored particles and/or the electrophoretic particles, the faster the particles will move for a given electric field strength.

The above controls over the display of colors in a multi-color system may be applied to a display layer of microcapsules containing any number of differently colored particle sets or electrophoretic particle sets, for example including two, three, four or even more particle sets. Highlight color particle sets, for example blue highlight color, red highlight color, green highlight color and the like highlight color particle sets may be included in multi-color particle sets to add additional color range capabilities to the display, and the control of the colors may be effected as described above. The total particle sets, including highlight color particle sets, in the display medium thus may be five, six, seven, eight or even more.

Figure 2:
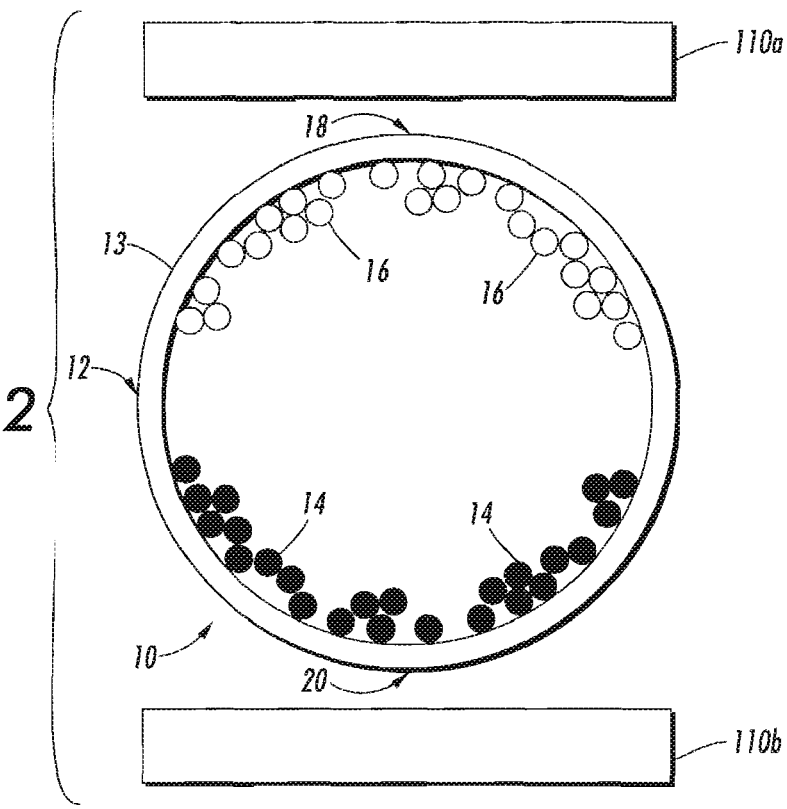
FIG. 2 is a cross-sectional view of a microcapsule having suspended sets of particles in a second state in an embodiment of the present disclosure.

Referring now to the drawings wherein like numerals refer to like parts, FIGS. 1 and 2 illustrate a microcapsule 10. In embodiments, the microcapsule 10 may be, for example, an electrophoretic microcapsule having at least two differently colored sets of particles suspended in the display media therein. In embodiments, the microcapsule 10 may encapsulate the particles as described above.

The microcapsule 10 may have a shell 12 that encapsulates a first set of particles 14 and/or a second set of particles 16 (hereinafter "sets of particles 14, 16") as shown in FIGS. 1 and 2 and described above. The sets of particles 14, 16 may be suspended in the display medium within the shell 12 of the microcapsule 10, and may be located in a color mode or in a white mode as illustrated in FIGS. 1 and 2, respectively. In embodiments, the shell 12 of the microcapsule 10 may have an outer surface 13 that may have the adhesive thereon as described above.

FIGS. 3-7 and 10 illustrate a method 200 for producing a color electrophoretic display 100 (hereinafter "display 100") with a multiplicity of microcapsules 10. The display 100 may be, for example a four-color display with high resolution (hereinafter "four-color display") or a highlight two-color display with high resolution (hereinafter "two-color display"). In embodiments, the four-color display may include full color, such as red, green, blue and black. In embodiments, the two-color display may include a non-white color and white, black and white or two different non-white colors. A two-color display and a four-color display refers to, for example, any display capable of displaying two different colors and four different colors, respectively. Examples include black and white colors, as well as full color displays such as red, green, blue and/or black, or cyan, magenta, yellow and/or black, and highlight color displays, including two colors highlighted and/or shaded with a third color and/or a fourth color.

Figure 3:
FIGS. 3-7 are steps for forming an electrophoretic display in an embodiment of the present disclosure.

In FIG. 3, a substrate 102 may be attached or connected to an optional water absorbent layer 104. The optional water absorbent layer 104 may be separated from and/or removed from the substrate 102. In embodiments, the optional water absorbent layer 104 may absorb fluid, such as water, a portion of a solution or the like. After absorbing the fluid, the optional water absorbent layer 104 may be removed from the substrate 102 and may be disregarded.

In embodiments, the substrate 102 may be, for example a porous media that allows a liquid to pass through the substrate 102. The liquid may be collected for recycle and/or discarded. Where the optional water absorbent layer 104 is used for collecting, the optional water absorbent layer 104 may be dried, reused or discarded. The substrate 102 may also be, for example, a liquid absorbing substrate which may absorb fluid, such as water, a portion of the solution or the like, or a non-absorbent substrate. As a result, the substrate 102 may be used alone without the presence of the optional water absorbent layer 104, and subjected to drying to complete removal of the liquid. The substrate 102 may require a surface of the substrate to be coated with an agent, such as a microcapsule immobilizing agent, to retain the microcapsule 10 to the substrate 102 during removal of the liquid. In embodiments, the substrate 102 may be made of a flexible material, such as, for example, a plastic or the like. The substrate 102 and/or the optional water absorbent layer 104 may be made of PVA, starch or cellulose or other inkjet transparency coating-type materials.

Figure 10:
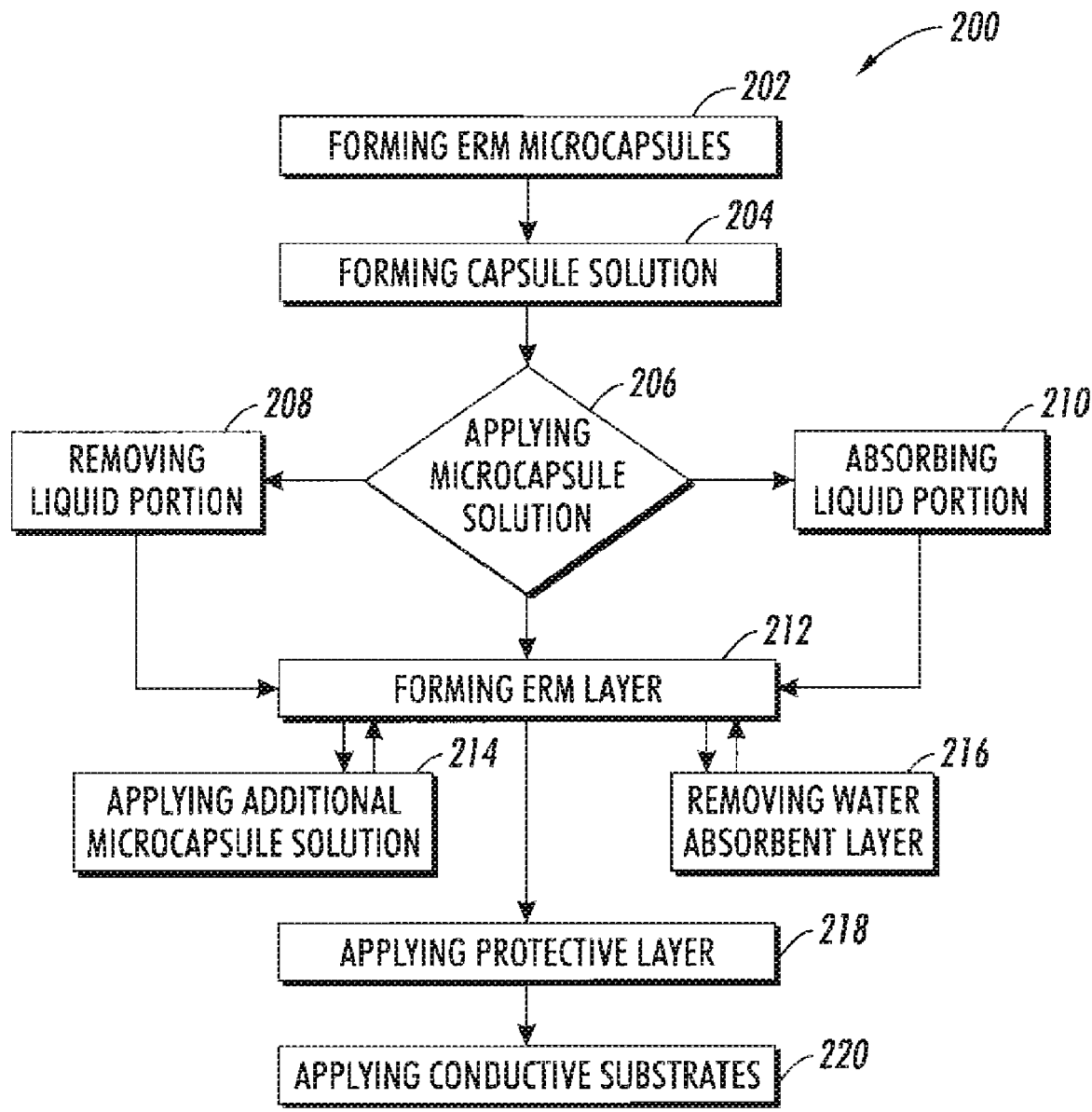
FIG. 10 is a flow chart of a method for forming an electrophoretic display in an embodiment of the present disclosure.

The microcapsule 10 may be formed to provide the four-color display or the two-color display as shown at step 202 in FIG. 10. After formation of the microcapsules 10, the microcapsules 10 may be added to and may be stabilized within a solution to form or to define a microcapsule solution as shown at step 204.

In embodiments, liquid drops of the microcapsule solution may be applied to or dispensed onto the substrate 102 by a liquid dispensing method, such as a high-resolution liquid dispensing method as shown at step 206. The high-resolution liquid dispensing method may be, for example a piezoelectric ink-jetting method (hereinafter "PIJ method"), a continuous ink jetting method or the like. Applying the microcapsule solution to the substrate 102 may allow the liquid drops of the microcapsule solution to be ejected from the print head of the PIJ method or a microscopic nozzle of the continuous ink jetting method onto the substrate 102. The high-resolution liquid dispensing method of applying the microcapsule solution may be any ink jetting method having the print head or a microscopic nozzle capable of ejecting the liquid drops of the microcapsule solution as known to one skilled in the art.

Using the PIJ method to eject liquid drops of the microcapsule solution for applying the microcapsule solution to the substrate 102 may not require the microcapsule solution to be heated, as with a thermal inkjet method jetting solid inks, prior to ejecting the liquid drops onto the substrate 102. As a result, the microcapsule solution may be applied to the substrate 102 at room temperature or ambient conditions. In embodiments, the print head or the microscopic nozzle may heat the microcapsule solution prior to ejecting the liquid drops of the microcapsule solution onto the substrate 102.

Dining application of the liquid drops of the microcapsule solution, the print head or the microscopic nozzle may be capable of simultaneously ejecting one or more liquid drops of the microcapsule solution onto the substrate 102. In embodiments, the liquid drops may be large enough to include more than one microcapsule. Thus, the print head or the microscopic nozzle may be able to print or to emit liquid drops that contain microcapsules having a size of up to about 100 microns or so.

The print head or the microscopic nozzle may print, may dispense or may apply the microcapsule solution to the substrate 102 via the liquid drops. A liquid portion of the microcapsule solution may be dried or may be removed from the substrate 102 as shown in step 208 of FIG. 10. In embodiments, the liquid portion of the microcapsule solution may be partially or substantially made from water. The liquid portion may evaporate from, may be removed from or be dried from the substrate 102 by exposing the substrate 102 to heat, to slight heat or to no heat. As a result, the substrate 102 may remove the liquid portion of the microcapsule solution applied thereon. Thus, the substrate 102 may not include the optional water absorbent layer 104 for removing the liquid portion of the microcapsule solution. In embodiments, the liquid portion may be removed by absorption by the optional water absorbent layer 104 as shown at step 210.

Figure 4:
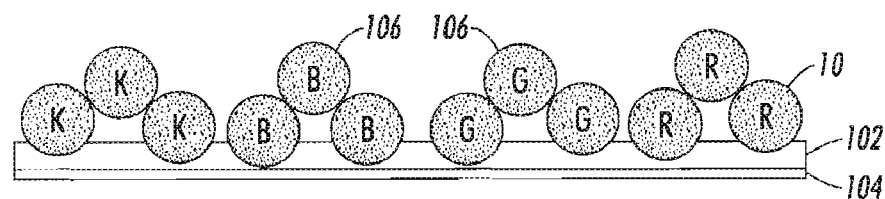

After the liquid portion of the microcapsule solution may be removed from the substrate 102, a display layer 106 of the microcapsules 10 may remain on or may be formed on the substrate 102 as illustrated in FIG. 4 and shown at step 212 of FIG. 10. The display layer 106 which may remain on the substrate 102 may form or may define a color density for the microcapsules 10 on the substrate 102. In embodiments, the display layer 106 of the microcapsules 10 may have a thickness of from, for example, about 5 to about 1,000 µm, such as from about 10 to about 500 µm or from about 20 to about 350 µm. In embodiments, the color density formed or defined by the display layer 106 may be continuous, uninterrupted and/or consistent across the substrate 102. In embodiments, the display layer 106 of the microcapsules 10 form a monolayer (a layer having a thickness substantially corresponding to the average diameter of the microcapsules 10 of that display layer 106) in a display layer of the display device. However, multiple display layers, for example 2 to about 10 or 2 to about 4, may also be used.

In embodiments, to form a display device that may be capable of displaying multiple colors or full color, more than one display layer 106 may be applied to the substrate 102 via the ink jetting method. For example, with a first pass of a print head, a first display layer having microcapsules 10 that may contain a set of red particles and a set of white particles may be applied to the substrate 102. As a result, the microcapsule 10 of the first layer may define a first subpixel of each pixel for the display device. With a second pass, a second display layer having microcapsules 10 that may contain a set of blue particles and a set of white particles may be applied to the substrate 102 to define a second subpixel for each pixel of the display device. With a third pass, a third display layer having microcapsules 10 that may contain a set of green particles and a set of white particles may be applied to the substrate 102 to define a third subpixel for each pixel of the display device. With a fourth pass, a fourth display layer having microcapsules 10 that may contain a set of black particles and a set of white particles may be applied to the substrate 102 to define a fourth subpixel for each pixel of the display device. Of course, the different color combinations of the microcapsules may all be applied together from a print head capable of simultaneously applying multiple colors, such print head being known in the art.

The microcapsules of the first, second, third and fourth display layers may define the four subpixels for each pixel of the display device. Each subpixel may be capable of displaying a colored particle or a white particle. As a result, each pixel of the display device may be capable of displaying full color, white or multiple colors, i.e., red, blue, green and black. The colored particles and white particles in each microcapsule for each subpixel may be controlled to display a color or white to provide full color images.

In embodiments, the print head, in a single pass, may dispense or apply a single display layer having microcapsules onto the substrate to define more than one subpixel for each pixel, such as two subpixels or four subpixels for each pixel of the display device. The print head may disperse microcapsules, in a single pass or in more than one pass, onto the substrate 102 to provide desired colored particles in one or more subpixels for each pixel of the display device. As a result, the print head may control dispersion of one or more display layers of microcapsules having one or more desired colored particles within subpixels forming pixels capable of displaying two or more colors.

In embodiments, the optional adhesive on the surface 13 of the microcapsules or substrate may adhere, may retain or may bond the microcapsules 10 or the display layer 106 to the substrate 102 with or without removal of the liquid portion of the microcapsule solution. In embodiments, when the substrate 102 is non-liquid absorbing, the microcapsule immobilizing agent on the surface of the substrate 102 may adhere, may retain or may bond the microcapsules 10 of the display layer 106 to the substrate 102 with or without removal of the liquid portion of the microcapsule solution. Thus, the microcapsule 10 or the display layer 106 may be adhered to, may be retained on or may be bonded to the substrate 102 by the adhesive properties of or the adhesive on the shell 12 of the microcapsules 10 and/or the microcapsule immobilizing agent on the substrate 102.

In embodiments, the color density formed or defined by the display layer 106 may not be continuous, uninterrupted or consistent along the substrate, the print head may apply, may dispense or may print additional liquid drops onto the substrate 102 as shown at step 214 in FIG. 10. After removing liquid portions from the additional liquid drops dispensed onto the substrate 102, the display layer 106 which may remain on the substrate 102 may be continuous, uninterrupted and/or consistent. The print head or the microscopic nozzle may dispense any amount of additional liquid drops onto the substrate 102 until the display layer 106 on the substrate 102 may be continuous, uninterrupted and/or consistent across the substrate 102. Thus, the display layer 106 may be multiple display layers of microcapsules 10 on the substrate 102.

The color density formed by or defined by the display layer 106 that may remain on the substrate 102 may have a resolution of about seventy-five (75) dots per square inch (dpi) or more. The resolution of the display layer 106 on the substrate 102 may depend on, may be based on or may be associated with a size of the liquid drops and/or a diameter of the microcapsules 10 within the microcapsule solution. For example, as the size of the liquid drops or the diameter of the microcapsules 10 may decrease, the resolution of the display layer 106 may increase on the substrate 102.

Figure 5:
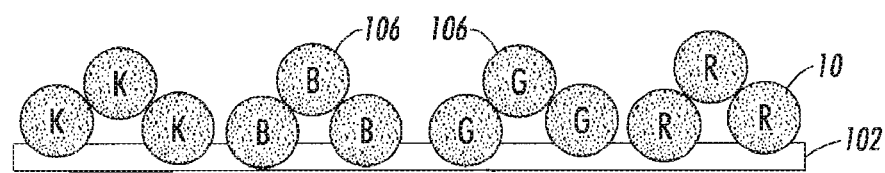

The optional water absorbent layer 104 may be removed from or separated from the substrate 102 as shown in step 216 of FIG. 10. As a result, the substrate 102 may remain with the display layer 106 as illustrated in FIG. 5. Alternatively, the substrate 102 may not include the optional water absorbent layer 104 and may not require removal of the optional water absorbent layer 104. Nevertheless, after the liquid portion is removed by the substrate 102 or the optional water absorbent layer, the substrate 102 may remain with the display layer 106.

Figure 6:
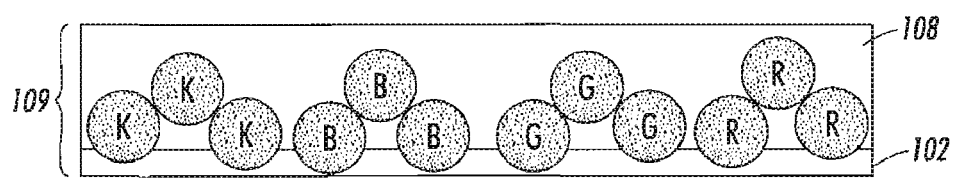

A protective layer 108 may be applied to or dispersed upon the substrate 102 and/or the display layer 106 as shown at step 218. As a result, the substrate 102, the display layer 106 and the protective layer 108 may form or may define a combined structure 109 as illustrated in FIG. 6.

Figure 7:
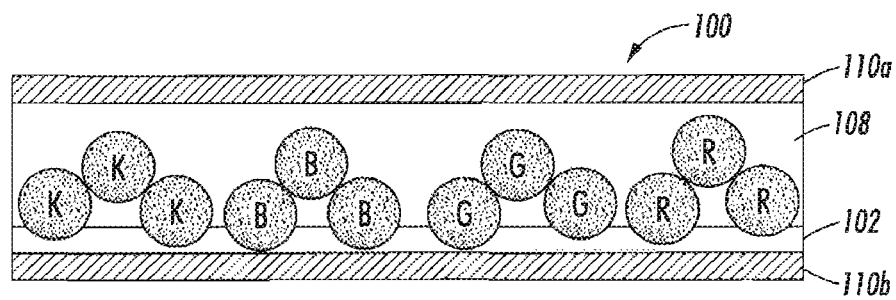

A first or a front conductive substrate 110a and/or a second or rear conductive substrate 110b (hereinafter "conductive substrates 110a, 110b") may be applied to the combined structure 109 as shown at step 220 in FIG. 10. The combined structure 109 may be located, sandwiched or positioned between the conductive substrates 110a, 110b as illustrated in FIG. 7. In embodiments, the protective layer 108 may be adjacent to the front conductive substrate 110a, and the substrate 102 may be adjacent to the rear conductive substrate 110b. The display device 100 may be defined by or may be formed by the combined structure 109 and the conductive substrates 110a, 110b. Formation of the display device 100 by the combined structure 110 and the conductive substrates 110a, 110b may have a manufacturing cost that may be lower than a manufacturing cost associated with a conventional display.

The conductive substrates 110a, 110b may either be flexible or rigid. The top side 18 of the shell 12 for the microcapsules 10 of the display layer 106 may be located adjacent to the front conductive substrates 110a. As a result, the sets of particles 14, 16 which may be located or positioned adjacent to the top side 18 of the shell 12 for the microcapsules 10 in the display layer 106 may be visible through the front conductive substrate 110a.

The conductive substrates 110a, 110b that sandwich the display layer 106 of the microcapsules 10 therebetween may have a length and width corresponding to the overall length and width of the substrate 102 or the display layer 106. The conductive substrates 110a, 110b thus may be continuous, unitary films that are not present as just separated pieces over the display layer 106 of the display device, although a plurality of segregated substrates may also be used. The conductive substrates 110a, 110b may be made to be as thin as possible while still maintaining appropriate conductive properties and structural integrity. For example, the conductive substrates 110a, 110b may have a height, or thickness, of from about 10 microns to about 500-microns, such as from about 10 to about 250 microns or from about 20 to about 100 microns.

The display device 100 may have any suitable overall length and width as desired. The display device 100 may also be made to have any desired height, although a total height of from about 30 to about 1,000 microns, such as from about 30 to about 400 microns or from about 50 to about 300 microns, may be used in terms of size and ease of use of the display device 100.

In embodiments, the rear conductive substrate 110b may apply the electric field to one or more microcapsules of the display layer 106, for example by transmitting the field as applied by selective electrodes associated with the substrate as discussed above. The electric field may switch or move the sets of particles within the microcapsules 10 of the display layer 106 to display desired particles as described above. The electric field may move a desired or an intended set of particles so as to be displayed by the microcapsules 10 via the front substrate 110a. The microcapsules 10 of the display layer 106 which may define or form one or more subpixels for each pixel of the display layer 106 on the substrate 102 may be controlled by the electric field to display the desired particles. By controlling the particles displayed by the subpixels for each pixel of the display layer, the pixels may be controlled by the electric field to form the image via the display layer 106 of the display 100.

In embodiments, a field-effect transistor (not shown in the figures) may be attached to or may be connected to the conductive substrates 110a, 110b to control a conductivity of the conductive substrates 110a, 110b or to provide voltage-controlled resistors for the conductive substrates 110a, 110b. In embodiments, a thin film transistor (not shown in the figures) may be attached to or may be connected to the rear conductive substrate 110b to provide a field-effect transistor for the rear conductive substrate 110b. The field-effect transistor or the thin film transistor may be applied to the rear conductive substrate 110b to apply the electric field to microcapsules 10 of the display layer 106.

The image may be formed by applying the electric field to the microcapsules 10 that define one or more pixels or one or more subpixels for displaying desired particles thereby. The rear conductive substrate 110b may apply or may not apply the electric field to each microcapsule 10 defining each pixel or each subpixel for the display device 100. By applying or not applying the electric field to each microcapsule 10 defining each pixel or each subpixel, the rear conductive substrate 110b may control positions for each of the sets of particles 14, 16 in the microcapsules 10 as illustrated in FIGS. 1 and 2. As a result, the rear conductive substrate 110b may control the microcapsules 10 of the display layer 106 to form an image on the display device 100.

Figure 8:
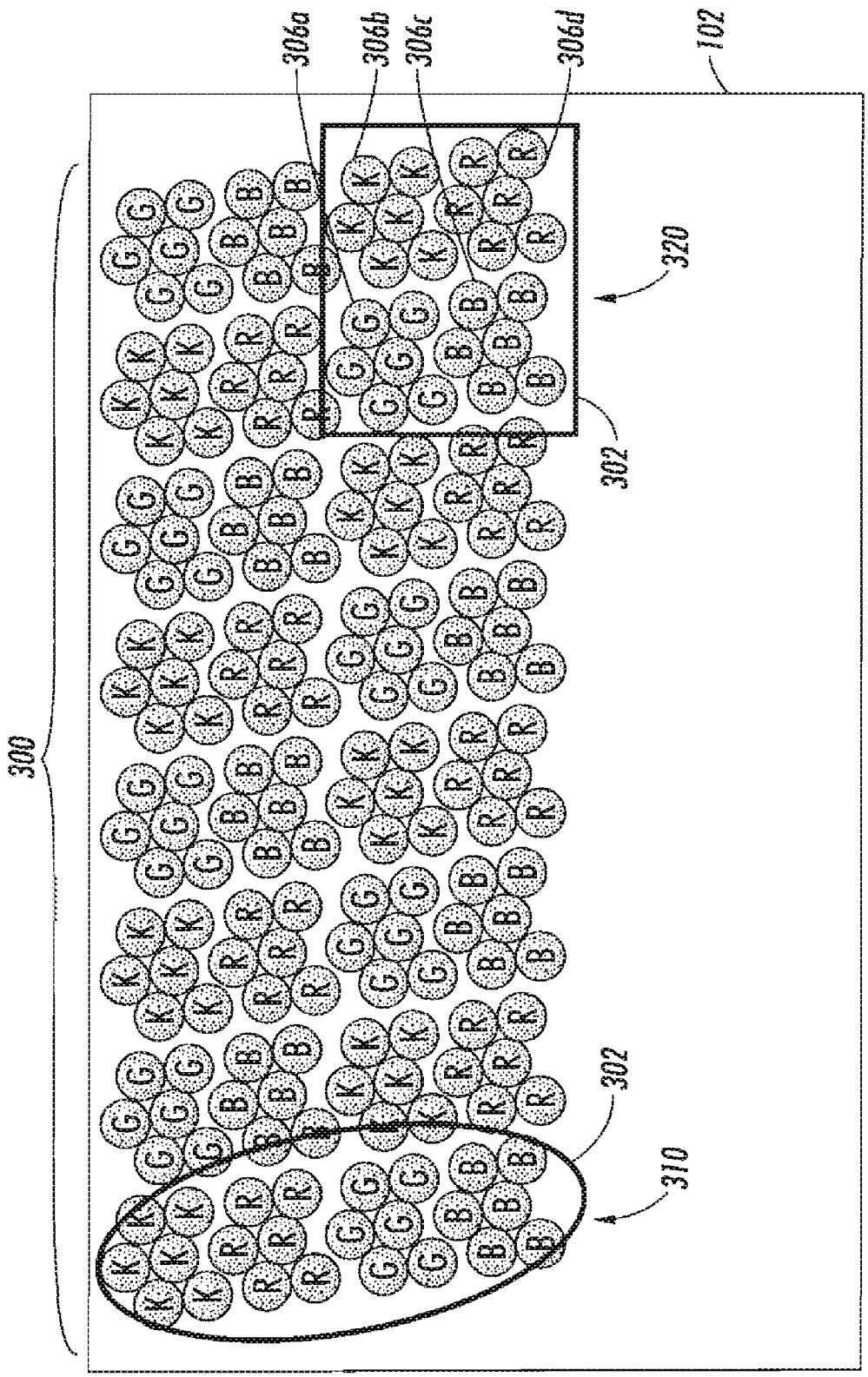
FIGS. 8 and 9 are top planar views of a layout having microcapsules on a substrate in an embodiment of the present disclosure.
Figure 9:
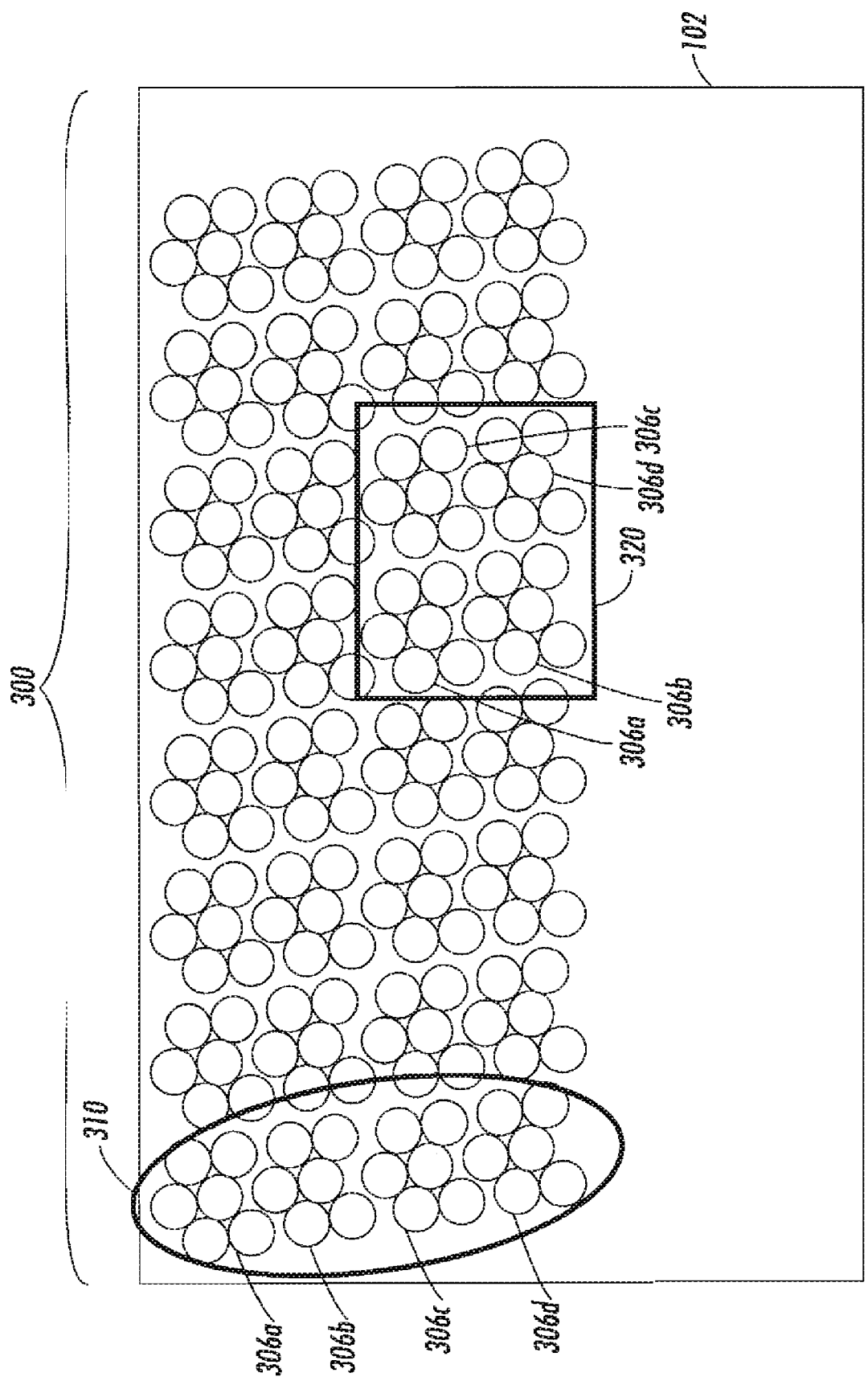

FIGS. 8 and 9 illustrate that the substrate 102 may have a layout 300 including the display layer 106 positioned thereon. The layout 300 may include a multiplicity of microcapsules 10 in the display layer 106 that are positioned or located adjacent to each other defining a pixel 302 of the display layer 106. The layout 300 and/or the display layer 106 may contain any number of pixels 302 that may be required to achieve a desired resolution for the display layer 106 of the display 100. Each of the microcapsules 10 forming the pixel 302 of the display layer 106 may define a subpixel of the pixel 302.

Each pixel 302 on the substrate 102 may be orientated in a first configuration 310 or a second configuration 320 as shown in FIGS. 8 and 9. The first configuration 310 of the pixel 302 may include four (4) microcapsules, such as microcapsules 306a-306d that may extend vertically or horizontally across the substrate 102. The second configuration 320 of the pixel 302 may include the microcapsules 306a-306d that may be formed in a box-shape or a square-shape. In embodiments, each of the microcapsules 306a-306d defining each pixel 302 may be a microcapsule having differently colored particles. For example, each pixel 302 may include the microcapsule 306a that may contain a set of red particles, the microcapsule 306b that may contain a set of green particles, the microcapsule 306c that may contain a set of blue particles, and the microcapsule 306d that may contain a set of black particles. Along with the colored particles, each of the microcapsules 306a-306d of the layout 300 on the substrate 102 may contain a set of white particles.

In embodiments, each of the microcapsules 306a-306d for each pixel 302 may contain a first set of colored particles and a second set of differently colored particles. For example, the microcapsule 306a may contain a set of red particles and a set of green particles, the microcapsule 306b may contain a set of red particles and a set of blue particles, the microcapsule 306c may contain a set of blue particles and a set of green particles and the microcapsule 306d may contain a set of white particles and a set of black particles. In embodiments, each pixel 302 may be defined by three (3) microcapsules, such as the microcapsules 306a-306c. For example, the microcapsule 306a may contain a set of cyan particles, the microcapsule 306b may contain a set of yellow particles, and the microcapsule 306c may contain a set of magenta particles.

As described above, the rear conductive substrate 110b may apply the electric field to the microcapsules 10 defining each subpixel for each pixel 302, or to each of the capsules 306a-306d of each pixel 302. The set of colored particles and/or the set of white particles may switch or may move position within the each of the microcapsules 306a-306d for each pixel 302 depending the electric field and/or the conductivity charge associated with each particle set. As a result, each microcapsule of or each subpixel of each pixel 302 may display the colored particles or the white particles via the microcapsules 306a-306d and may be in the color mode or a combination of the color mode and the white mode.

Thus, each pixel 302 or each subpixel of each pixel 302 may display a color, such as, blue, green, red, black, white, cyan, yellow, magenta, white or a combined color thereon based on the particle set nearest to the front conductive substrate 110a. As a result, each pixel 302 may display an intended color through the front conductive substrate 110a via the subpixels of each pixel 302 on the substrate 102 as shown in FIG. 8. As a result, the layout 300 may display a full colored image and/or a black and white image.

In embodiments, the electric-field may change as applied to certain ones of the microcapsules that define each subpixel for each pixel 302 of the layout 300. The particle sets displayed by the selective microcapsules that define one or more of the subpixels thus may switch or move positions based on the change in electric field. In embodiments, microcapsules 306a-306d for each pixel 302 may display the set of white particles that may be visible through the first electrode layer 110a based on the electric field and/or the conductivity charge associated with the particle sets. As a result, the layout 300 on the substrate 102 may display no image or be in white mode as shown in FIG. 9.

In embodiments, the substrate 102 may display a half-toning effect via the microcapsules 306a-306d defining subpixels of each pixel 302. The half-toning effect may be achieved by applying, not applying or reversely applying the electric field to less than all of the microcapsules 306a-306d for one or more pixels 302 of the layout 300. As a result, a first portion of the microcapsules 306a-306d for one or more pixels 302 may display colored particles, and the second portion of the microcapsules 306a-306d for one or more pixels 302 may display white particles based on the electric field and/or the conductivity charge associated with the particle sets. Thus, the half-toning effect may be defined by or formed by one or more pixels 302 that have the first portion of the microcapsules 306a-306d displaying the sets of the colored particles and the second portion of the microcapsules 306a-306d displaying the white particles.

The microcapsules 306a-306d or subpixels for each pixel 302 may have a microcapsule size within a range of about 10 microns to about 150 microns, more preferably in a range of about 20 microns to about 120 microns. In embodiments, the layout 300 on the substrate 102 may have a resolution of about seventy-five (75) dpi, and each pixel 302 of the layout 300 may have a pixel size in a range of about 300 microns to about 360 microns. With a resolution of about seventy-five (75) dpi, the layout 300 on the substrate 102 may have a resolution which may be similar to or substantially similar to a resolution of a computer screen or a monitor.

The rear conductive substrate 110b may apply the electric field to any number of the microcapsules 306a-306d for each pixel 302 of the layout 300. As a result, the layout 300 may display an image at high resolution by displaying colored particles for any number of the microcapsules 306a-306d of any number of the pixels 302. In embodiments, the image may be displayed by all of the subpixels of each pixel 302 or by all of the pixels 302 by the layout 300.

In embodiments, the orientation or the location of each of the microcapsules 306a-306d allows for developing or for displaying the full colored image at high resolution via the subpixels of the pixels 302. To display the full colored image at high resolution, the microcapsules 306a-306d for each pixel 302 may be required to be orientated in a sequence to display the sets of colored particles within the full colored image at the high resolution. For example, the microcapsules 306a-306d for each pixel 302, in the first configuration 310, may be required to be in a sequence from the microcapsule 306a at an upper location to the microcapsule 306d at a lower location, with the microcapsules 306b, 306c therebetween as shown in FIGS. 8 and 9. In a second configuration 320 for the pixel 302, the microcapsule 306a may be located in an upper left position, the microcapsule 306b may be located in an upper right position, the microcapsule 306c may be located in a lower left position, and the microcapsule 306d may be located in a lower right position. As a result, each microcapsule 306a-306d or subpixel for each pixel 302 may display a specific set of non-white color particles to form or to define the image on the layer 300 at high resolution.

The print head of the ink jetting method may emit liquid drops of the microcapsule solution onto the substrate 102 to form pixels 302 in the first configuration 310 or the second configuration 320. The print head may place each of the microcapsules 306a-306d at the proper orientation to achieve the first configuration 310 or the second configuration 320. Moreover, the print head may be capable of positioning the microcapsules 306a-306b at any desired orientation to form any configuration as known to one skilled in the art.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A method for forming a multi-color electrophoretic display, the method comprising:
    providing a solution containing microcapsules dispersed in a liquid, wherein the microcapsules comprise:
        a shell that is transparent; and
        a display medium within the shell, wherein the display medium is comprised of either (a) at least two sets of differently colored particles in a substantially clear fluid, or (b) at least one set of colored particles in a differently colored fluid;
    dispensing the solution onto a substrate, with a water absorbent layer on an opposite side of the substrate from a side of the substrate onto which the solution is dispensed, wherein a display layer of microcapsules is formed on the substrate, and wherein the water absorbent layer absorbs the liquid of the solution dispensed onto the substrate;
    subsequently removing the water absorbent layer with the absorbed liquid;
    positioning a conductive substrate adjacent to the substrate, wherein the substrate is located between the display layer and the conductive substrate, wherein the conductive substrate applies an electric field to at least one microcapsule of the display layer, and wherein the sets of particles of each microcapsule in the display layer are movable within the microcapsule by the electric field so as to be displayed.

2. The method according to claim 1, further comprising: positioning a second conductive substrate adjacent to the display layer and opposite the conductive substrate, wherein the second conductive substrate is transparent.

3. The method according to claim 1, further comprising: applying a protective layer onto the display layer, wherein the display layer is located between the substrate and the protective layer.

4. The method according to claim 1, wherein the dispensing comprises jetting the solution onto the substrate via an ink jet head.

5. The method according to claim 4, wherein the microcapsules are jetted such that each microcapsule of the display layer defines a subpixel of a pixel of the display.

6. The method according to claim 5, wherein each pixel includes at least three different two particle set microcapsules, comprised of either (a) microcapsules in which the display medium contains both red and white colored particles, microcapsules in which the display medium contains both blue and white colored particles and microcapsules in which the display medium contains both green and white colored particles or (b) microcapsules in which the display medium contains both red and green colored particles, microcapsules in which the display medium contains both blue and green colored particles and microcapsules in which the display medium contains both red and blue colored particles.

7. The method according to claim 1, further comprising:
    forming a pixel of an image with at least two microcapsules of the display layer, wherein one of the at least two microcapsules is adjacently positioned to another of the at least two microcapsules.

8. The method according to claim 1, wherein the display layer on the substrate includes a monolayer of microcapsules or multiple layers of microcapsules.

9. The method according to claim 1, wherein the microcapsules of the display layer are continuous across the display layer on the substrate.

10. A method for forming a multi-color electrophoretic display, the method comprising:
    providing at least three solutions containing microcapsules, wherein the microcapsules of the at least three solutions comprise
        a shell that is transparent and
        a display medium within the shell, wherein the display medium is comprised of at least two sets of differently colored particles in a fluid, wherein the at least three solutions are comprised of either (a) a first solution comprised of microcapsules in which the display medium contains both red and white colored particles, a second solution comprised of microcapsules in which the display medium contains both blue and white colored particles, and a third solution comprised of microcapsules in which the display medium contains both green and white colored particles or (b) a first solution comprised of microcapsules in which the display medium contains both red and green colored particles, a second solution comprised of microcapsules in which the display medium contains both blue and green colored particles, and a third solution comprised of microcapsules in which the display medium contains both red and blue colored particles;
    jetting the at least three solutions onto a substrate to form a display layer of the microcapsules of the jetted solutions on the substrate; and
    positioning a conductive substrate adjacent to the substrate, wherein the substrate is located between the display layer and the conductive substrate, wherein the conductive substrate applies an electric field to at least one microcapsule of the display layer, wherein the colored particles of each microcapsule in the display layer are movable within the microcapsule by the electric field so as to be displayed.

11. The method according to claim 10, further comprising: positioning a transparent substrate adjacent to the display layer, wherein the display layer is located between the transparent substrate and the substrate.

12. The method according to claim 10, wherein the solutions are jetted such that one or more of the microcapsules of each jetted solution form a subpixel of a pixel of the display.

13. The method according to claim 10, wherein the display layer on the substrate includes a monolayer of microcapsules or multiple layers of microcapsules.

14. The method according to claim 12, wherein the solutions are jetted such that each pixel of the display is comprised of the microcapsules of the first solution, the microcapsules of the second solution and the microcapsules of the third solution stacked vertically.

15. The method according to claim 10, wherein the at least three solutions are comprised of a first solution comprised of microcapsules in which the display medium contains both red and white colored particles, a second solution comprised of microcapsules in which the display medium contains both blue and white colored particles, and a third solution comprised of microcapsules in which the display medium contains both green and white colored particles, and wherein the at least three solutions further include a fourth solution comprised of microcapsules in which the display medium contains both black and white colored particles.

16. The method according to claim 15, wherein the solutions are jetted such that each pixel of the display is comprised of the microcapsules of the first solution, the microcapsules of the second solution, the microcapsules of the third solution and the microcapsules of the fourth solution stacked vertically.

17. The method according to claim 15, wherein the solutions are jetted such that each pixel of the display is comprised of the microcapsules of the first solution, the microcapsules of the second solution, the microcapsules of the third solution and the microcapsules of the fourth solution in a box-shape.

18. The method according to claim 10, further comprising including a water absorbent layer on an opposite side of the substrate from a side of the substrate onto which the solutions are dispensed, wherein the water absorbent layer absorbs a liquid portion of the solution dispensed onto the substrate, and subsequently removing the water absorbent layer.

19. The method according to claim 1, wherein the display medium has a conductivity of from about $10^{-11}$ to about $10^{-15}$ S/m.

* * * * *